United States Patent Office 3,327,732
Patented June 27, 1967

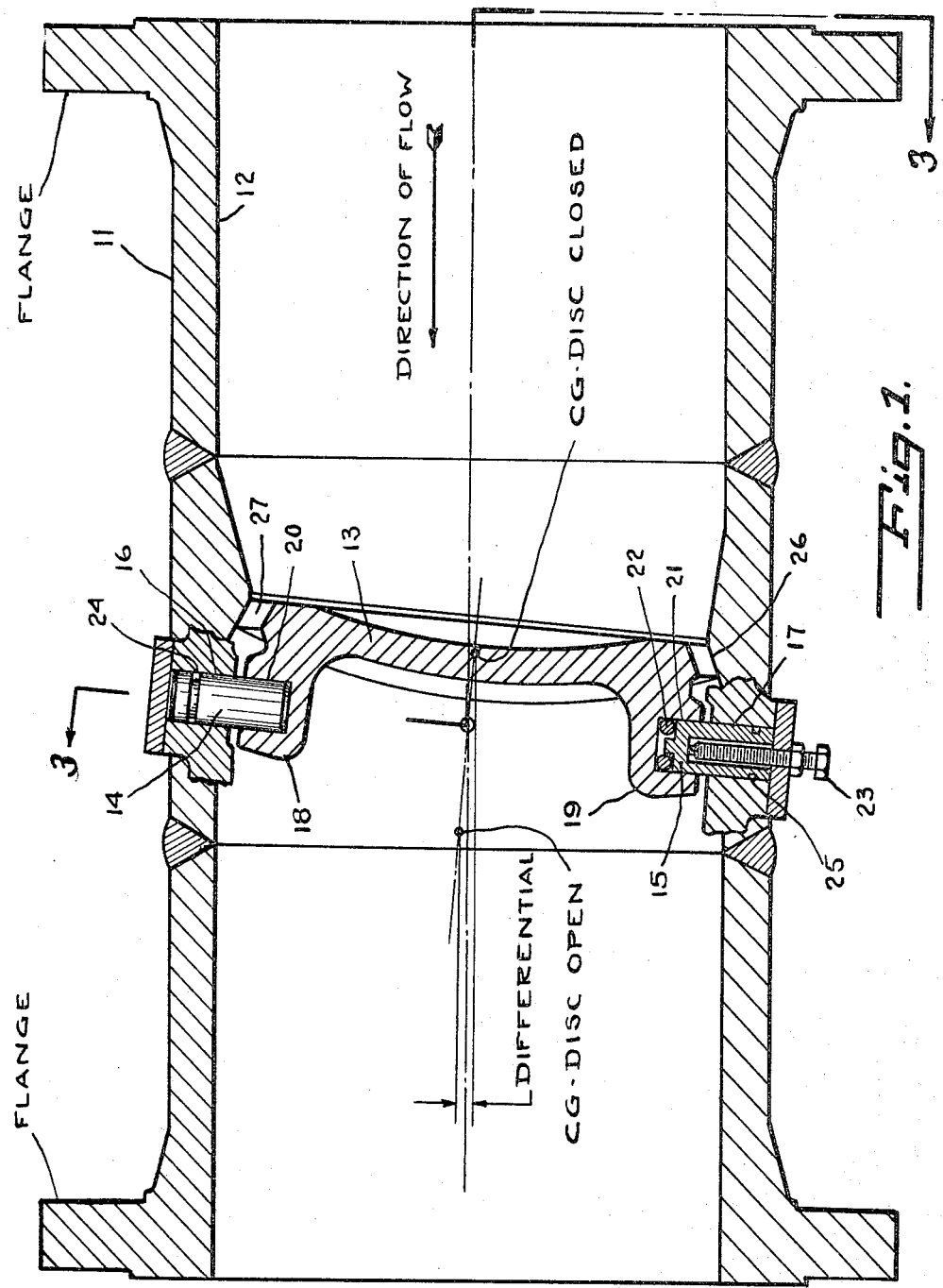

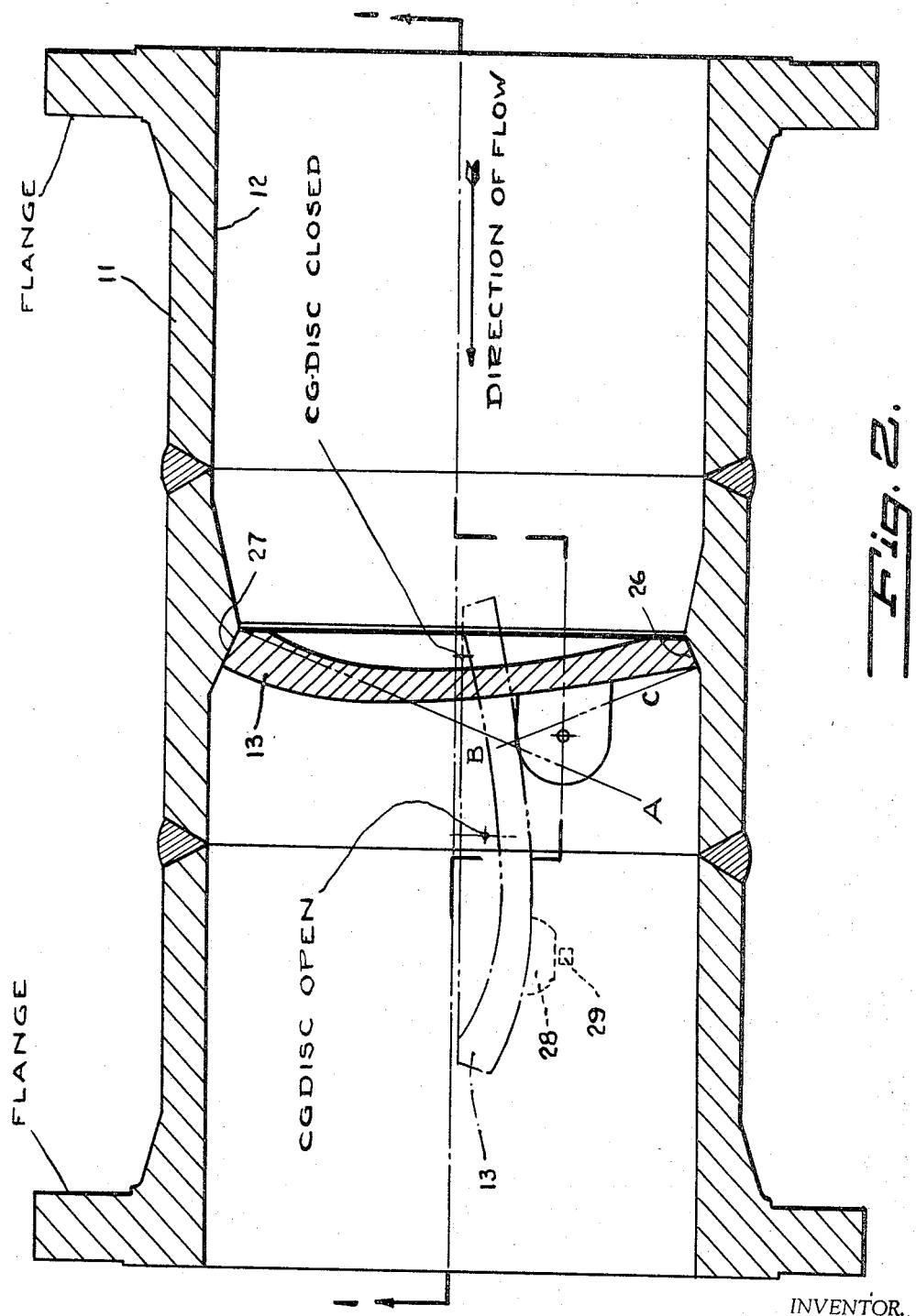

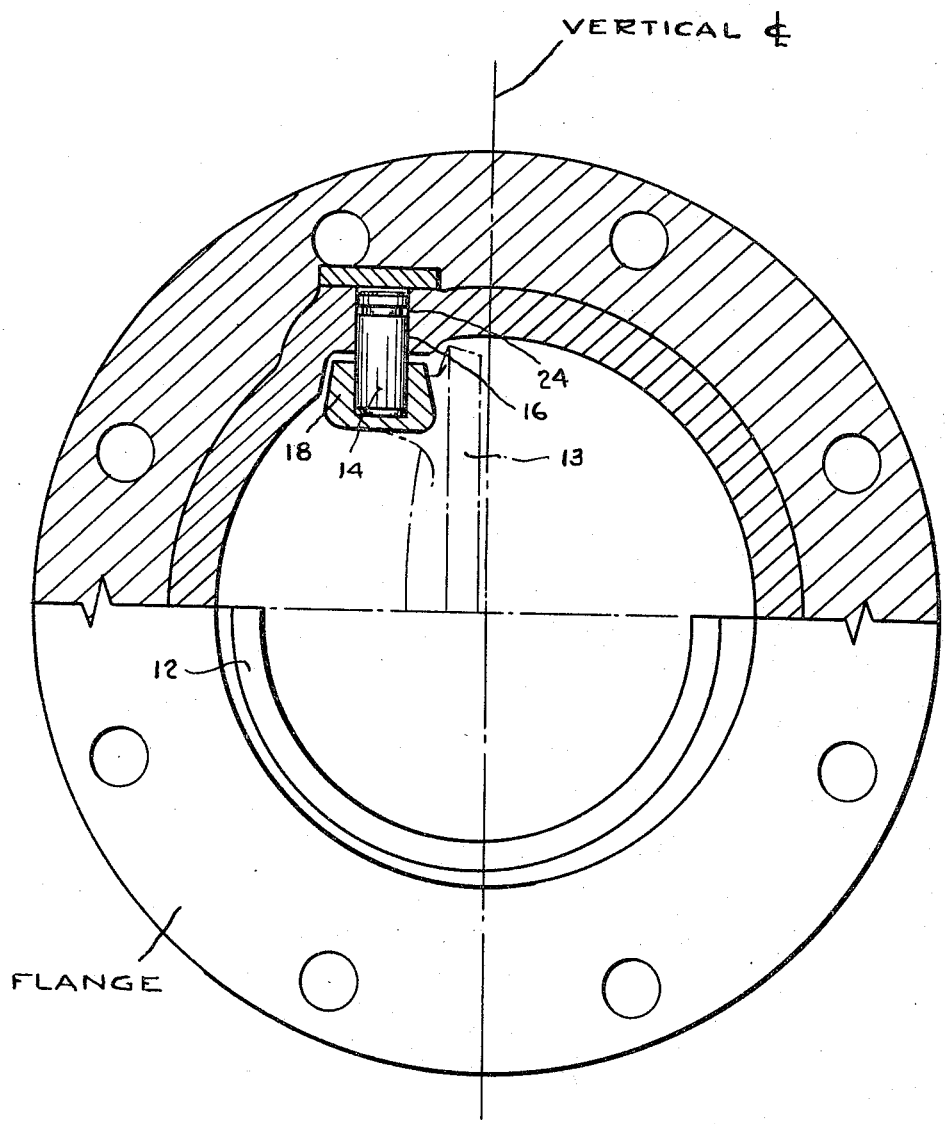

3,327,732
TILTING DISC NON-RETURN VALVE
Vagn Devé, Chomedey, Quebec, Canada, assignor to Dominion Engineering Works, Limited
Filed Oct. 14, 1963, Ser. No. 315,992
7 Claims. (Cl. 137—527.8)

This invention relates to valves and the like and has particular reference to the provision of a new and improved tilting disc non-return type valve.

Fundamentally, there are several basic classes of check valves in which the effect of gravity assists in the closure of the movable member of the valve. Said classes of check valves, more specifically, include ball type check valves, swing or flap type check valves, and tilting disc type check valves. Said classes of check valves, however, are usually not interchangeable in application due to functional requirements.

For example, ball check valves are subject to high head losses which restrict their application; and swing or flap check valves are generally constructed with the disc or flap member suspended from an overhead bearing and are prone to slamming under certain conditions. Furthermore, said latter mentioned check valves, also, suffer the inherent disadvantage of high head loss, thus, making uneconomical their application in systems which will not tolerate such losses. Moreover, as the angular opening of the disc or flap of said disc or flap check valves is dictated by the velocity of the fluid being valved, the disc bearings are subjected to severe wear whenever the velocity of said fluid fluctuates.

With particular regard to tilting disc type check valves, such valves are designed such as to eliminate or minimize the objectionable characteristics which are usually associated with ball and swing type check valves.

As previously described, in a swing or flap type check valve, the discs or flaps have a tendency to slam when closing, such initiating vibration phenomena which frequently results in damage to pipes or joints. In a tilting disc type check valve, however, through the combination of the concept of a bevel edged valve disc and a corresponding conical valve seat with a particular geometric relationship of the disc to the offset disc pivots, disc slamming may be eliminated. Furthermore, in tilting disc check valves, due to the aerodynamic shape of the disc, said disc is maintained in the open position against a stop, thus, eliminating wear on the disc bearings due to fluctuations in the velocity of the fluid. Also, valves of the tilting disc type are notable for their low head loss.

It is an object of the present invention to provide a new and improved tilting disc non-return type check valve.

Another object of the present invention is to provide a new and improved tilting disc type check valve in which the axes of the disc pivots are substantially in a vertical plane parallel to the center line of the valve.

Another object of the invention is to provide a new and improved check valve of the type set forth in which the axes of the disc pivots are in a predetermined geometric relationship with respect to the valve seat.

Another object is to provide a new and improved valve of the type set forth which is suitable for high pressure application.

Another object is to provide a new and improved check valve of the type set forth in which the valve disc will remain in the closed position when there is a zero flow condition and no pressure differential over the disc.

Another object is to provide a new and improved check valve of the character set forth in which the valve disc opens to its maximum extent, without external assistance, at low fluid velocity.

Another object is to provide a new and improved valve of the type set forth which has low head loss characteristics due to the streamlined shape of the internal passage combined with a conical shaped valve seat and a bevel edged disc.

Other objects and advantages of the invention will be apparent from the following description taken in connection with the accompanying drawings. It will be understood that changes may be made in the details of construction and arrangement of parts shown and described as the preferred form of the invention has been given by way of illustration only.

Referring to the drawings:

FIG. 1 is a sectional view in the vertical plane, taken along line 1—1 of FIG. 2 looking in the direction of the arrows, illustrating a tilting disc type check valve incorporating the present invention;

FIG. 2 is a sectional schematic view in the horizontal plane of the form of valve illustrated in FIG. 1 illustrating the geometric relationship of the disc pivots to the valve seats; and FIG. 3 is a view, partially in section, taken along line 3—3 of FIG. 1 looking in the direction of the arrows.

Referring more particularly to the drawings wherein similar reference characters designate corresponding parts throughout the several views, the device illustrated in FIG. 1 comprises the tilting disc valve body 11 which includes the bore 12 in which valve disc 13 is pivotally mounted by the upper trunnion shaft 14 and the lower trunnion shaft 15, said shafts 14 and 15 being rigidly secured into, but removable from, upper trunnion shaft locating bore 16 and lower trunnion shaft locating bore 17, respectively. Valve disc 13 is provided with upper and lower lugs 18 and 19, which lugs 18 and 19 contain upper and lower bearings 20 and 21 respectively, said lugs being so dimensioned that said disc 13 is permitted free oscillatory movement of shafts 14 and 15 within predetermined limits, said limits being the closed position and the open position determined by the stop 28 on said disc 13 and a stop pin 29 in the valve body 11 (FIG. 2).

A thrust bearing 22 of the low friction type is located at the end of bearing 21 which supports the axial load of the disc 13; and the lower trunnion shaft 15 is provided with an adjusting screw 23 which permits small axial adjustments of said disc 13. Furthermore, both upper trunnion shaft 14 and lower trunnion shaft 15 are provided with O-ring type seals 24 and 25 respectively for preventing leakage of the fluid being valved.

It will be seen that the center line of trunnion shafts 14 and 15 lies in a vertical plane extending parallel to the vertical plane containing the main axis of the valve body, and in chordal relation to the valve body, the trunnion axis being inclined with the upper end in an upstream direction at a preferred angle in the range between 4 and 11°. Such arrangement of the trunion shafts 14 and 15 establishes the vertical displacement through which the center of gravity of the disc 13 must move from the open to the closed position. The differential between the centers of gravity of said disc 13 in both the open and the closed position is illustrated in FIG. 1. This differential, it will be seen, is relatively small, if compared with the larger vertical displacement in the center of gravity of discs of conventional valves in moving from the closed position to the open position or vice versa.

As an example of the benefits derived from the aforedescribed construction, in a valve designed for twenty-four inch pipe service, a conventional tilting disc type check valve requires a minimum flow velocity of 11.38 feet per second in order to maintain the valve disc open against the stop without flutter; whereas, in a correspondingly dimensioned valve constructed in accordance with the present invention, it has been found that the disc 13 will be held open against the stop at a minimum flow velocity of 3.45 feet per second.

With particular reference to FIG. 2 of the drawings, such illustrates schematically that an established relationship exists between the angle of valve disc bevelled edge 27 and the trunnion shaft locating bores 16 and 17 which must be positioned within the angle A—B—C comprised of normals to the seat angle in the horizontal plane. Details of said valve disc bevelled edge 27 as well as those of valve seat 26 are shown in FIG. 1.

From the foregoing it is believed to be apparent that the tilting disc non-return type check valve provided by the present invention comprises, in brief, a valve body 11, a tilting disc 13 mounted in said body 11, pivot means for pivotally mounting said tilting disc, said pivot means having an axis which is inclined in a substantially vertical plane, the axis of said pivot means having its upper end upstream of the lower end of said axis.

In the operation of the device illustrated in FIGS. 1 through 3, with the disc 13 in the closed position and assuming that a pressure differential exists over said disc, fluid which is to pass through the valve bore 12, in the direction indicated by the arrow, lifts said disc 13 off of valve seat 26 and rotates said disc through an arc of substantially ninety degrees (FIG. 2) until disc stop 28 abuts stop pin 29 when said disc 13 will be held in the open position by virtue of the pressure differential resulting from the change in the velocities adjacent to the disc.

Providing that a certain minimum fluid velocity is maintained, said minimum velocity necessary for the valve of the present invention being only approximately thirty percent of that required in conventional valves of its type, disc 13 will remain in the open position. However, should the velocity of said fluid be reduced below a certain minimum velocity, such will allow the disc 13 to return to its closed position and to resume being a drop tight seal on valve seat 26 without slamming and with negligible head loss.

From the foregoing it will be seen that I have provided new and improved means for accomplishing all of the objects and advantages of the invention.

I claim:

1. In a tilting disc non-return valve for installation in a pipe line a valve body having a main longitudinal axis; an annular internal seat within said body lying in a plane inclined at an acute angle to said main axis and having a bevelled sealing surface; a valve disc mounted within said valve body downstream of said seat, having an annular bevelled sealing surface to seal against the bevelled sealing surface of said seat when in the closed position; trunnion pivot means attached to the rear downstream face of the disc when viewed in the closed position, said downstream face being of curved section to promote uniform flow conditions through the valve, said pivot means being located on a pivot axis lying in a plane extending substantially chordally across said valve body parallel with and offset from the plane containing the longitudinal axis of the valve body, said axis being inclined from the vertical to raise the position of the centre of gravity of the disc in the open position, relative to the closed position, whereby in the open position a portion of said disc extends upstream of said pivot axis in flow stabilizing relation therewith, a component of the mass of said disc biasing said valve to the closed position.

2. A non-return valve as claimed in claim 1 wherein the angle of inclination of said pivot axis from the vertical is in the range from 4° to 11°.

3. A non-return valve as claimed in claim 1 wherein the rear surface of said disc is of aerodynamic shape, whereby a zone of low pressure is generated adjacent said surface upon flow of liquid therepast, to sustain the valve in the open position while incurring low head loss on liquid flow therethrough.

4. A non-return valve as claimed in claim 3 wherein said trunnion pivot means includes an upper trunnion and a lower trunnion, said lower trunnion including a low friction type bearing provided with screw adjustment means to permit adjustment of said disc relative to the valve body.

5. A non-return valve as claimed in claim 4 including O-ring seal means about said trunnions to prevent leakage of fluid from the valve.

6. A non-return valve as claimed in claim 3 including limiting means to limit the open position of the valve.

7. A non-return valve as claimed in claim 6 wherein the said limiting means comprise a stop attached to said valve disc, and a stop pin located within said valve body.

References Cited

UNITED STATES PATENTS

| 1,929,758 | 10/1933 | Spear | 137—527.8 X |
| 2,172,371 | 9/1939 | Feighan | 137—527.4 |
| 2,383,482 | 8/1945 | Hirshstein | 137—527.6 |
| 2,541,665 | 2/1951 | Prudhon | 137—527.8 X |

FOREIGN PATENTS

| 139,544 | 11/1950 | Australia. |
| 1,111,630 | 3/1956 | France. |

WILLIAM F. O'DEA, *Primary Examiner.*

DAVID J. ZOBKIW, *Assistant Examiner.*